United States Patent Office 3,373,151
Patented Mar. 12, 1968

3,373,151
PATRICIN A AND B AND RELATED COMPOUNDS
Miklos Bodanszky, Princeton, Miguel A. Ondetti, Highland Park, and John T. Sheehan, Middlesex, N.J., assignors, by mesne assignments, to E. R. Squibb & Sons, Inc., New York, N.Y., a corporation of Delaware
No Drawing. Filed Jan. 28, 1965, Ser. No. 428,845
16 Claims. (Cl. 260—112.5)

ABSTRACT OF THE DISCLOSURE

This invention relates to new chemical compounds having the formula

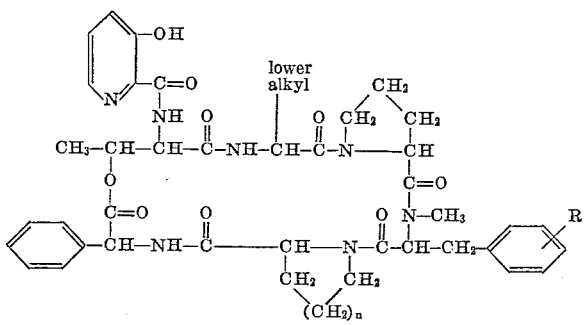

and to new intermediates used in the synthesis of those compounds. R in the above formula represents hydrogen, halogen or lower alkyl and $n$ represents 1 or 2. Preferred are compounds in this group wherein R is hydrogen and the lower alkyl group is ethyl. When $n=1$, the compound has been named patricin A; when $n=2$, the compound has been named patricin B. The compounds are useful as antimicrobial agents.

---

This invention relates to new synthetic chemical compounds. More particularly, this invention relates to new compounds of the formula (I)

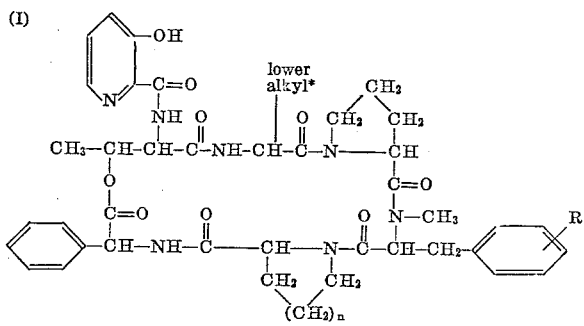

and to new intermediates used in the synthesis of those compounds.

In Formula I, R represents hydrogen, halogen or lower alkyl and $n$ represents 1 or 2. All four halogens are included, but chlorine and bromine are preferred, especially in the paraposition. The lower alkyl groups include both straight and branched chain lower aliphatic hydrocarbon radicals. Preferred are those compounds wherein $n$ is 1 and R is hydrogen, especially when the lower alkyl group (indicated by an asterisk in Formula I) is ethyl. The preferred compound of Formula I wherein $n$ is 1, R is hydrogen and the lower alkyl group is ethyl has been named patricin A and the compound of Formula I wherein $n$ is 2, R is hydrogen and the lower alkyl group is ethyl has been named patricin B. For convenience, these names will be used hereinafter.

The compounds of Formula I may be produced by wholly synthetic means. The sequence of steps is described below in detail.

The starting material used in Step 1 determines the nature of R in the succeeding intermediates and the final product. If N-methyl-L-phenylalanine is the starting compound then R is hydrogen in each succeeding intermediate and this carries through to the final product. However, if an N-methyl-phenylalanine bearing a halogen or lower alkyl group on the phenyl ring is used instead, then the halogen or lower alkyl group will carry through the succeeding intermediates to the final product.

Similarly, if a prolinate is used in Step 2, intermediates and final products including a 5-membered ring system ($n=1$) will result. Substituting a pipecolate for the prolinate will give intermediates and final products having a six-membered ring ($n=2$).

If α-aminobutyric acid is used in Step 3, then the lower alkyl group (indicated by an asterisk in Formula I) will be an ethyl group. But if an amino acid other than α-aminobutyric acid is used, the lower alkyl group will vary with the length of the aliphatic chain of the amino acid. For example, the use of alanine will result in a methyl group, valine in an isopropyl group, leucine in a sec-butyl group, etc. The same alkyl group will carry through the intermediates to the final product.

Patricin A is obtained by using N-methyl-L-phenylalanine, proline and D-α-aminobutyric acid. Patricin B is obtained by using N-methyl-L-phenylalanine, pipecolic acid and D-α-aminobutyric acid. The additional compounds of Formula I are obtained by changing the starting materials as described below.

The new compounds of this invention are useful as antimicrobial agents, e.g., in combatting the organism B. subtilis. More particularly, the compounds of this invention enhance the antimicrobial activity of the known antibiotic vernamycin A, especially against organisms such as Staphylococcus, e.g., Staphylococcus aureus, and Streptococcus, e.g., Streptococcus lactis, when administered together with this antibiotic even when the vernamycin A is in subinhibitory concentration.

Patricin A inhibits the growth of Earle's L cells at an inhibitory dose ($ID_{50}$) of 40 micrograms/ml. in suspension culture [Proc. Soc. Exper. Biol. and Med. 102, 290–292 (1959)].

The following describes the synthesis of the compounds of this invention, with temperatures expressed on the centigrade scale.

Step 1.—Benzyloxycarbonyl-N-methyl-L-phenylalanine

N-methyl-L-phenylalanine (10.74 g., 60 mmole) is dissolved in a mixture of 0.9 N lithium hydroxide (69.6 ml.) and tetrahydrofuran (114 ml.). Benzyloxycarbonyl chloride (15 ml.) and 0.9 N lithium hydroxide (120 ml.) are added in 10 portions over 20 minutes, keeping the temperature near 10° with an ice bath. By the final addition, the mixture is milky. Stirring in the ice bath is continued for a total of 5 hours, then the slightly milky solution is washed with ether (150 ml.). A dense white precipitate forms and is washed again with ether. The aqueous suspension is acidified to pH 1–3 with 5 N hydrochloric acid and extracted with ether (4× 100 ml). The combined ether extracts are washed with water, dried over magnesium sulfate, and concentrated to dryness in vacuo. The oily residue is crystallized from etherhexane (1:2). Yield: 15.3 g. (81%), M.P. 70–72°. The mother liquor gives a second crop, 0.5 g., M.P. 68–70°. The two crops are joined and recrystallized from ethyl acetatehexane. Yield: 11.7 g. (62%), M.P. 70–71°. A second crop 1.1 g., M.P. 69–71° (total yield: 68%); $[\alpha]_D^{21}$ −71.2° (c. 2.5, ethyl acetate).

Analysis.—Calc'd for $C_{18}H_{19}O_4N$: C, 69.01; H, 6.07; N, 4.47. Found: C, 69.03; H, 6.08; N, 4.42.

By substituting for the N-methyl-L-phenylalanine an N-methyl-L-(o-, m- or p-) halophenylalanine or an N-methyl-L-(o-, m- or p-) lower alkylphenylalanine, then the corresponding halo substituted or lower alkyl substituted product is obtained and the substituent group is carried on the phenyl ring through the succeeding intermediates to the final product. Thus N-methyl-L-p-chlorophenylalanine and N-methyl-L-methylphenylalanine yield benzyloxycarbonyl-N-methyl-L-p-chlorophenylalanine and benzyloxycarbonyl-N-methyl-L-p-methylphenylalanine, respectively.

The dicyclohexylammonium salt is prepared by addition of dicyclohexylamine to an ethyl acetate solution of the acid, followed by precipitation with hexane. It melts at 116–118°.

Analysis.—Calc'd for $C_{30}H_{42}O_4N_2$: C, 72.85; H, 8.56; N, 5.66. Found: C, 72.78; H, 8.64; N, 5.84.

Step 2.—t-Butyl benzyloxycarbonyl-N-methyl-L-phenylalanyl-L-prolinate

Benzyloxycarbonyl-N-methyl-L-phenylalanine (12.50 g., 40 mmole) and t-butyl prolinate (6.85 g., 40 mmole) are dissolved in ethyl acetate (80 ml.) with stirring and cooling in an ice bath. Dicyclohexylcarbodiimide (8.24 g., 40 mmole) is added, washed in with ethyl acetate (15 ml.). After 2 hours in the ice bath, 3.5 hours at room temperature, and 0.5 hours in the ice bath, the precipitate of dicyclohexylurea (7.35 g.) is filtered off, washing with ethyl acetate (100 ml.). The filtrate is washed with 5% citric acid (50 ml.), water (50 ml.), saturated sodium bicarbonate (50 ml.), and water. It is dried over magnesium sulfate and concentrated to dryness in vacuo. The yellow oil weights 18.6 g. (100%). This product is used without further purification in the preparation of the tripeptide. For purposes of characterization, after removal of the benzyloxycarbonyl group, the oxalate and hydrochloride of the free base t-butyl N-L-phenylalanyl-L-prolinate are prepared. M.P. of the oxalate (145) 147–149°, $[\alpha]_D^{31}$ −45.5° (c. 1, dimethylformamide).

Analysis.—Calc'd for $C_{21}H_{30}O_7N_2$: C, 59.70; H, 7.16; N, 6.63. Found: C, 59.70; H, 7.23; N, 6.92.

M.P. of the hydrochloride 224–225° (dec.), $[\alpha]_D^{19}$ −64° (c. 1, dimethylformamide).

Analysis.—Calc'd for $C_{19}H_{29}O_3N_2Cl$: C, 61.87; H, 7.87; N, 7.60; Cl, 9.63. Found: C, 61.47; H, 7.62; N, 7.20; Cl, 10.06.

By forming t-butyl pipecolate from pipecolic acid and substituting this for the t-butyl prolinate in the above procedure, the t-butyl benzyloxycarbonyl-N-methyl-L-phenylalanylpipecolate is formed and the six membered ring system is carried through the following intermediates to produce patricin B.

Step 3.—Benzyloxycarbonyl-D-α-aminobutyric acid

D-α-aminobutyric acid (20.60 g., 0.2 mole) is dissolved in 5 N-sodium hydroxide (40 ml.) with stirring and cooling in an ice bath. Benzyloxycarbonyl chloride (38 ml.) and 5 N sodium hydroxide (50 ml.) are added in five portions over 30 minutes, keeping the pH strongly alkaline. After an additional 30 minutes, the mixture is washed with ether (3× 40 ml.) to remove excess acid chloride, then acidified to Congo red endpoint with 5 N hydrochloric acid. The resulting oil is seeded and crystallized. The crystals are filtered and washed with water. Yield: 45.82 g. (97%); M.P. 78–79°; $[\alpha]_D^{21}$ +9.1° (c. 2.8, absolute ethanol); $[\alpha]_D^{22}$ +14.4° (c. 4, N sodium hydroxide).

Analysis.—Calc'd for $C_{12}H_{15}O_4N$: C, 60.75; H, 6.37; N, 5.90. Found: C, 60.94; H, 6.32; N, 6.10.

By replacing the D-α-aminobutyric acid in the above procedure with D-alanine, D-valine, D-leucine, D-isoleucine, D-α-aminovaleric acid and D-α-aminocaproic acid, then the following compounds are obtained, respectively:

benzyloxycarbonyl-D-alanine,
benzyloxycarbonyl-D-valine,
benzyloxycarbonyl-D-leucine,
benzyloxycarbonyl-D-isoleucine,
benzyloxycarbonyl-D-α-aminovaleric acid and
benzyloxycarbonyl-D-α-aminocaproic acid.

This results in a methyl, isopropyl, sec-butyl, α-methylpropyl, propyl or butyl group, respectively, carrying through the succeeding intermediates to the final product where this is reflected in the lower alkyl group indicated by an asterisk in Formula I.

Step 4.—p-Nitrophenyl benzyloxycarbonyl-D-α-aminobutyrate

Benzyloxycarbonyl-D-α-aminobutyric acid (42.6 g., 180 mmole) and p-nitrophenol (30.0 g., 214 mmole) are dissolved in ethyl acetate (540 ml.) with stirring in an ice bath. Dicyclohexylcarbodiimide (37.0 g., 180 mmole) is added, washing in with ethyl acetate (180 ml.). After one hour in the ice bath and 2.5 hours at room temperature, acetic acid (3.6 ml.) is added; and a few minutes later, the precipitate of dicyclohexylurea (37.4 g., 93%) is filtered off, washing with ethyl acetate (3× 75 ml.). The filtrate is evaporated to dryness and the oily residue crystallized from isopropyl ether. Yield: 49.8 g. (77%), M.P. 60–61°, $[\alpha]_D^{24}$ +34.4° (c. 2, dimethylformamide).

Analysis.—Calc'd for $C_{18}H_{18}O_6N_2$: C, 60.33; H, 5.06; N, 7.82. Found: C, 60.23; H, 5.26; N, 7.84.

Step 5.—Benzyloxycarbonyl-D-α-aminobutyryl-L-proline

A solution of p-nitrophenyl benzyloxycarbonyl-D-α-aminobutyrate (7.16 g., 20 mmole) in tetrahydrofuran (50 ml.) is added to another of L-proline (2.96 g., 24 mmole) in water (50 ml.). The pH is maintained at 9.0 by the controlled addition of 4 N sodium hydroxide. When the reaction is completed (after 2 hours, no more uptake of sodium hydroxide is observed), the clear yellow solution is acidified to pH 6.8–7.0 with 5 N hydrochloric acid, concentrated in vacuo to remove tetrahydrofuran and finally saturated with solid sodium bicarbonate. This solution is washed several times with ethyl acetate until nearly colorless. The ethyl acetate extracts are backwashed twice with saturated sodium bicarbonate solution. The aqueous phases are acidified to pH 2–3 with concentrated hydrochloric acid and extracted five times with ethyl acetate. The combined ethyl acetate extracts are washed with water, dried over magnesium sulfate, and concentrated to dryness in vacuo. The oily residue is dissolved in either and upon addition of dicyclohexylamine a crystalline precipitate of the dicyclohexylammonium salt is obtained and isolated by filtration. Yield: 7.60 g. (74%), M.P. 112–114°, $[\alpha]_D^{21}$ −28.3° (c. 2, 95% ethanol).

Analysis.—Calc'd for $C_{29}H_{45}O_5N_3$: C, 67.50; H, 8.80; N, 8.15. Found: C, 67.37; H, 9.02; N, 8.10.

Step 6.—t-Butyl benzyloxycarbonyl-L-prolyl-N-methyl-L-phenylalanyl-L-prolinate t-Butyl benzyloxycarbonyl-N-methyl-L-phenylalanyl-L-prolinate (18.7 g., 40 mmole) is dissolved in a mixture of absolute ethanol (100 ml.) and acetic acid (100 ml.). To this solution, 10% palladium on charcoal (2.0 g.) is added, and the mixture is stirred for 4.5 hours in a hydrogen atmosphere. The catalyst is filtered off, and the filtrate is concentrated to near dryness in vacuo and reconcentrated twice more after dilution with benzene. The oily residue is dissolved in ethyl acetate (200 ml.) and washed with saturated sodium bicarbonate (50 ml.) containing enough solid bicarbonate so that the wash remains alkaline. The ethyl acetate is then washed with water (30 ml.) and the bicarbonate and water washes joined and extracted with ethyl acetate (2× 40 ml.), which is then added to the main ethyl acetate. The combined ethyl acetate extracts are washed with water (25 ml.), dried over magnesium sulfate, and concentrated to dryness in vacuo. The oil which is t-butyl N-methyl-L-phenylalanyl-L-prolinate weighs 11.7 g. (35.2 mmole, 88%)

This oil and benzyloxycarbonyl-L-proline (8.33 g., 33.4 mmole) are dissolved in ethyl acetate (70 ml.) and the solution stirred in an ice bath. Dicyclohexylcarbodiimide (6.90 g., 33.4 mmole) is added and the mixture stirred for 2 hours in the ice bath, 4 hours at room temperature, and overnight at 5°. The precipitate of dicyclohexylurea (6.18 g., 82%) is filtered off, and the filtrate, after dilution with ethyl acetate (300 ml.) is washed with 5% citric acid (50 ml.), water (50 ml.), saturated sodium bicarbonate (50 ml.), water (2× 50 ml.) and saturated sodium chloride (20 ml.), dried over magnesium sulfate, and concentrated to dryness in vacuo. The oily residue, weighing 17.7 g. (94%) is used without further purification in the preparation of the tetrapeptide.

*Step 7.—t-Butyl benzyloxycarbonyl-D-α-aminobutyryl-L-prolyl-N-methyl-L-phenylalanyl-L-prolinate*

(A) t-Butyl benzyloxycarbonyl-L-propyl-N-methyl-L-phenylalanyl-L-prolinate (17.7 g., 31.4 mmole) is dissolved in a mixture of absolute ethanol (100 ml.) and acetic acid (100 ml.). To the resulting solution, 10% palladium on charcoal (2.0 g.) is added, and the mixture is stirred in a hydrogen atmosphere for 4.5 hours. The catalyst is filtered off, and the filtrate is concentrated to dryness in vacuo and reconcentrated twice after dilution with benzene.

The oily residue and p-nitrophenyl benzyloxycarbonyl-D-α-aminobutyrate (10.8 g., 30.1 mmole) are dissolved in pyridine (30 ml.) and allowed to react at room temperature for 3 days. The reaction mixture is then concentrated to near dryness in vacuo, dissolved in ethyl acetate (250 ml.), and washed with 2 N hydrochloric acid (50 ml.), water (50 ml.), N sodium carbonate (20× 30 ml.), and water (4× 50 ml.). After drying over magnesium sulfate, the solvent is removed in vacuo. The oily residue is dissolved in benzene, filtered from a small insoluble portion, and freeze-dried yielding 18.6 g. This crude product is distributed for 500 transfers in the solvent system chloroform-hexane-methanol-water (2.5:7.5:8:2). The contents of the tubes in the main peak (K=0.69) are pooled, concentrated to dryness in vacuo and freeze-dried from benzene. Yield: 13.3 g. (68%), $[\alpha]_D^{32}$—110° (c. 1, dimethylformamide).

*Analysis.*—Calc'd for $C_{36}H_{48}O_7N_4$: C, 66.64; H, 7.46; N. 8.64. Found: C, 66.34; H, 7.62; N, 8.54.

(B) Alternatively, benzyloxycarbonyl - D - α - aminobutyryl-L-proline (582 mg., 1.75 mmole, isolated from 920 mg. of the dicyclohexylammonium salt by acidification, extraction into ethyl acetate and removal of the solvent in vacuo) and t-butyl N-methyl-L-phenylalanyl-L-prolinate (648 mg., 1.95 mmole) are dissolved in ethyl acetate (8 ml.) and cooled in an ice bath. Dicyclohexylcarbodiimide (360 mg., 1.75 mmole) is added, and the mixture is stirred in the ice bath for 3 hours and then at room temperature overnight. The dicyclohexylurea (270 mg., 69%) is filtered off, and the filtrate is washed with 5% citric acid, water, saturated sodium bicarbonate, and water. After drying over magnesium sulfate, the solvent is removed in vacuo, and the residue is freeze-dried from benzene. This residue (1.0 g.) is distributed from 100 transfers in the solvent system, chloroform-hexane-methanol-water (2.5:7.5:8:2). Two peaks are observed, the larger with K=0.69 and the smaller with K=3.0. The peak K=0.69 is the desired tetrapeptide. The contents of the tubes in this peak are pooled, concentrated to dryness in vacuo and freeze-dried from benzene. Yield: 595 mg. (53%), $[\alpha]_D^{25}$—104° (c. 1, dimethylformamide).

*Analysis.*—Calc'd for $C_{36}H_{48}O_7N_4$: C, 66.64; H, 7.46; N, 8.64. Found: C, 66.48; H, 7.41; N, 8.64.

(C) As another alternative, benzyloxycarbonyl-D-α-aminobutyryl-L-proline (2.01 g., 6 mmole, isolated from 3.18 g. of the dicyclohexylammonium salt) and triethylamine (0.83 ml., 6 mmole) are dissolved in tetrahydrofuran (7 ml.) and the solution cooled in an ice-salt bath. Isobutyl chloroformate (0.79 ml., 6 mmole) is added, followed, after five minutes stirring in the cold bath, by a solution of N-methyl-L-phenylalanyl-L-proline t-butyl ester (1.76 g., 5.3 mmole) in tetrahydrofuran (5 ml.). The reaction mixture is stirred for another 2 hours in the cold bath and 3.5 hours at room temperature. After dilution with ethyl acetate (100 ml.), the suspension is washed with 5% citric acid (25 ml.), water (25 ml.), saturated $NaHCO_3$ (25 ml.), and finally water (3× 25 ml.). The organic layer is dried over magnesium sulfate, and the solvent removed in vacuo. Upon dilution of the oily residue with ether, a crystalline precipitate is observed which is filtered and washed with ether. It weighs 450 mg., M.P. 103–104°. The ether filtrate is concentrated to dryness and the residue distributed for 100 transfers in the solvent system: chloroform-hexane-methanol-water (2.5:7.5:8:2). Three major peaks (K=0.05, 0.69 and 4.0) and two minor ones (K=0.33 and 1.5) are observed. The peak with K=0.69 gives the desired tetrapeptide, 590 mg. (17%), $[\alpha]_D^{25}$—107° (c. 2, dimethylformamide).

*Step 8.—t-Butyloxycarbonyl-L-phenylglycine* t-Butyl carbazate (50 g., 0.38 mole) is dissolved in acetic acid (44 ml.) and water (65 ml.) with vigorous stirring and cooling in an ice-bath. A solution of sodium nitrite (28.7 g.) in water (80 ml.) is added gradually over a period of an hour, keeping the inside temperature between 3–11°. After the addition is complete, stirring is continued one hour longer. Water (65 ml.) is then added, the yellow t-butoxycarbonyl azide layer is separated, and the aqueous layer is extracted with ether (4× 25 ml.). The combined azide layer and ether extracts are washed with water (3× 25 ml.) and M sodium bicarbonate (3× 20 ml.). This azide solution is then added to a mixture of L-phenylglycine (30 g., 0.2 mole), magnesium oxide (15.2 g., 0.4 mole), water (300 ml.) and dioxane (500 ml.). The resulting suspension is stirred at 45–50° for ca. 24 hours. The mixture is then concentrated in vacuo to remove dioxane, diluted with ethyl acetate (600 ml.) and water (600 ml.), and filtered to remove magnesium oxide. The filtrate aqueous layer is extracted with ethyl acetate (250 ml.), acidified with solid citric acid (Congo red) and extracted with ethyl acetate (4× 400 ml.). The ethyl acetate extract is washed with water (4× 250 ml.), dried over magnesium sulfate, and concentrated to dryness in vacuo. The oily residue is crystallized from hexane. Yield: 37.15 g. (74%), M.P. 90–93°. This material is recrystallized from hot hexane. Yield: 33.30 g. (66%), M.P. 90.5–92.5°, $[\alpha]_D^{27}$+139° (c. 2, 95% ethanol).

*Analysis.*—Calc'd for $C_{13}H_{17}O_4N$: C, 62.14; H, 6.82; N, 5.57. Found: C, 62.16; H, 6.85; N, 5.75.

*O-(t-butyloxycarbonyl-L-phenylglycyl)-N-benzyloxycarbonyl-L-threonine, dicyclohexylammonium salt* t-Butyloxycarbonyl-L-phenylglycine (2.6 g., 10 mmole) and triethylamine (1.35 ml., 10 mmole) are dissolved in dry tetrahydrofuran (17.5 ml.), and the solution cooled in an ice-salt bath. Isobutylchloroformate (1.3 ml., 10 mmole) is added, followed, after five minutes stirring in the cold bath, by a solution of N-benzyloxycarbonyl-L-threonine (5 g., 20 mmole) and triethylamine (4 ml., 30 mmole) in dry tetrahydrofuran (20 ml.). The reaction mixture is stirred at room temperature for ca. 20 hours and then diluted with ethyl acetate (200 ml.) and washed with N hydrochloric acid (50 ml.) and water (6× 50 ml.). The organic layer is dried over magnesium sulfate and the solvent removed in vacuo. The residue is distributed for 200 transfers in the system chloroform-cyclohexane-methanol-water (5:5:8:2). The contents of the tubes corresponding to the peak with K=0.70 which is the desired product, are pooled and concentrated to dryness. The residue and dicyclohexylamine (1.5 ml.) are dissolved in acetone (10 ml.) and a crystalline precipitate of the dicyclohexylammonium salt is obtained by addition of hexane (35 ml.). Yield: 3.5 g. (54%), M.P. 145–147° softening at 143°, $[\alpha]_D^{28}+35.1°$ (c. 1, dimethylformamide).

*Analysis.*—Calc'd for $C_{37}H_{53}N_3O_8$: C, 66.57; H, 7.95; N, 6.30. Found: C, 66.46; H, 7.97; N, 6.38.

*Step 9.—t-Butyl O-(t-butyloxycarbonyl-L-phenylglycyl)-N - benzyloxycarbonyl - L-threonyl-D-α-aminobutyryl-L - prolyl - N-methyl-L-phenylalanyl-L-prolinate* t - Butyl N-benzylcarbonyl-D-α-aminobutyryl-L-prolyl-N-methyl-L-phenylalanyl-L-proline (10.5 g., 16 mmole) is dissolved in absolute ethanol (75 ml.) and acetic acid (75 ml.). To the resulting solution, 10% palladium on charcoal (1.05 g.) is added, and the mixture is stirred in a hydrogen atmosphere for 4.5 hours. The catalyst is filtered off, and the filtrate is concentrated to dryness in vacuo and reconcentrated twice after dilution with benzene. The oily residue is dissolved in ethyl acetate (260 ml.) and washed with saturated sodium bicarbonate (45 ml.) containing enough solid bicarbonate so that the wash remains alkaline. After washing the ethyl acetate layer with water (45 ml.), the aqueous washes are pooled and reextracted with ethyl acetate (2× 40 ml.). The ethyl acetate portions are pooled and washed with water (30 ml.). The organic layer is dried over magnesium sulfate and concentrated to dryness in vacuo. The residue is dried to constant weight, 6.9 g. (13.5 mmole).

This residue and o-(t-butoxycarbonyl-L-phenylglycyl)-N-benzyloxycarbonyl-L-threonine (7.3 g., 15 mmole, isolated from 10.0 g. of the dicyclohexylammonium salt) are dissolved in ethyl acetate (60 ml.), cooled in an ice bath and added with dicyclohexylcarbodiimide (2.8 g.). After 2 hours stirring in the ice bath, 4 hours at room temperature, and 0.5 hour in the ice bath, the precipitate of dicyclohexylurea is filtered off and washed with ethyl acetate (100 ml.). The filtrate is diluted with more ethyl acetate (100 ml.) and washed with 5% citric acid (50 ml.), water (50 ml.), saturated sodium bicarbonate (50 ml.) and water (3× 50 ml.). After drying over magnesium sulfate, the solvent is removed in vacuo. The residue (ca. 14 g.) is distributed for 500 transfers in the solvent system chloroform-hexane-methanol-water (2.5:7.5:8:2). The contents of the tubes in the main peak (K=1.05) are pooled, concentrated to dryness in vacuo and freeze-dried from benzene. Yield: 9.2 g. (62%), $[\alpha]_D^{32}$ —36.8° (c. 1, dimethylformamide).

*Analysis.*—Calc'd for $C_{53}H_{70}O_{12}N_6$: C, 64.77; H, 7.13; N, 8.55. Found: C, 64.59; H, 7.23; N, 8.57.

*Step 10.—2-hydroxymethyl-3-benzyloxypyridine*

To a solution of 32 g. (0.2 mole) of 2-hydroxymethyl-3-hydroxypyridine hydrochloride in 100 ml. of water, a solution of 26 g. of potassium hydroxide in 100 ml. of water containing 0.5 g. potassium iodide is added. The temperature is kept below 30° by external cooling and by controlling the rate of addition. To this solution, 300 ml. of methanol and 32 ml. of benzyl chloride are added, and the entire mixture stirred at room temperature in a closed vessel for 72 hours. After this period, the insoluble salt formed is filtered off and washed with methanol. The filtrate and washings are combined and concentrated in vacuo at a bath temperature of 30–35°. As all of the methanol is removed, the product separates and is filtered off. On standing, some additional product separates. The crude product weighs about 25 g. (60% yield), M.P. 73–75°. It is purified by dissolving in about 200 ml. normal hydrochloric acid; and after the acid solution has been extracted three times with 50 ml. of chloroform, the acid solution is, while cooling, made alkaline with 20% potassium hydroxide solution. The crystalline product is filtered off and washed with water.

If additional purification is required, the product is either distilled in good vacuum or crystallized from hexane or water. The product obtained under these conditions is a white, crystalline material with M.P. 81–82°; $R_f$=0.81 in butanol-acetic acid-water (4:1:5); U.V. spectrum shows $$E_{1\,cm.}^{1\%}=328$$

at 278 mμ and $$E_{1\,cm.}^{1\%}=907$$

at 218 mμ; I.R. spectrum, a substituted phenyl band at 13.6 and 13.25μ.

*Analysis.*—Calc'd for $C_{13}H_{13}NO_2$: C, 72.54; H, 6.09; N, 6.51. Found: C, 72.59; H, 6.12; N, 6.49.

*Step 11.—3-benzyloxypicolinic acid hydrochloride sesquihydrate*

To a stirred suspension of 14.5 g. (0.067 mole) of 2-hydroxymethyl-3-benzyloxypyridine, 7.7 g. (0.049 mole) of potassium permanganate is added, and the mixture heated to about 80° for one hour. After this period, a second portion of 7.7 g. of potassium permanganate and 150 ml. of water is added, and the heating and stirring continued for two hours at 75–85°. The reaction mixture is allowed to cool slightly and the manganese dioxide removed by gravity filtration and then washed with about 200 ml. of hot water. The combined filtrate and washings are then extracted three times with 100 ml. portions of chloroform and these extracts discarded. The aqueous mother liquor is acidified with 200 ml. concentrated hydrochloric acid and allowed to stand overnight in the cold (5°). The product which separates is filtered off and sucked dry. After air-drying, it weighs 15.5 g. (80%) and is essentially pure.

The product is further purified by dissolving in 100 ml. of methanol containing 5 ml. of N alcoholic hydrogen chloride. On dilution with 200 ml. of ethyl acetate, the product separates in beautiful crystals, which are filtered off and washed with ethyl acetate and allowed to air-dry. The yield is 11 g. (about 60%). The product melts at 108–112°. Chromatographed on paper in n-butanol-acetic acid-water (4:1:5), it shows an U.V. spot ($R_f$=0.86) which can also be revealed with bromophenol blue spray. The U.V. spectrum shows $$E_{1\,cm.}^{1\%}=140$$

at 288 mμ and $$E_{1\,cm.}^{1\%}=429$$

at 217 mμ. In the I.R. spectrum a carbonyl band is found at 5.85 and mono-substituted benzene bands at 13 and 13.5μ.

*Analysis.*—Calc'd for $C_{13}H_{11}NO_3 \cdot HCl \cdot 1\frac{1}{2} H_2O$: C, 53.34; H, 5.17; N, 4.79; Cl, 12.11. Found: C, 53.20; H, 5.32; N, 4.77; Cl, 12.27.

*Step 12.—p-Nitrophenyl 3-Benzyloxypicolinate*

3-benzyloxypicolinic acid hydrochloride, sesquihydrate (22.0 g., 75 mmole) is suspended in a mixture of ethyl acetate (320 ml.) and triethylamine (11.2 ml.) and stirred for one hour at room temperature. The crystals of triethylamine hydrochloride are filtered off and washed with ethyl acetate (2× 30 ml.). p-Nitrophenol (11.12 g.) and dicyclohexylcarbodiimide (16.8 g.) are added to the filtrate, and the mixture is stirred for 2 hours at room temperature and 0.5 hours in an ice bath. The precipitate of dicyclohexylurea (9.60 g., 53%) is filtered off and the filtrate is concentrated to dryness in vacuo. The crystalline residue is suspended in ether, filtered, and washed with ether. Yield: 14.38 g. (51%), M.P. 120–121° (dec.).

*Analysis.*—Calc'd for $C_{19}H_{14}O_5N_2$: C, 65.14; H, 4.03; N, 8.00. Found: C, 65.24; H, 4.06; N, 8.14.

*Step 13.—t-Butyl o-(t-butyloxycarbonyl-L-phenylglycyl)-N - (3-benzyloxypicolinyl)-L-threonyl-D-α-aminobutyryl-L-prolyl-N-methyl-L-phenylalanyl-L-prolinate* t-Butyl o - (t-butyloxycarbonyl-L-phenylglycyl)-N-benzyloxycarbonyl - L - threonyl-D-α-aminobutyryl-L-prolyl-N-methyl-L-phenylalanyl-L-prolinate (3.0 g., 3.06 mmole)

is dissolved in a mixture of absolute ethanol (30 ml.) and acetic acid (30 ml.) and hydrogenated in the presence of 10% palladium on charcoal (300 mg.) for 4.5 hours. The catalyst is filtered off and the filtrate concentrated to dryness in vacuo and freeze-dried from benzene. The residue is dissolved in dry pyridine (9 ml.) and p-nitrophenyl 3-benzyloxy-2-picolinate (1.6 g., 4.5 mmole) is added. After standing at room temperature for 3 days, the reaction mixture is concentrated to dryness in vacuo and freeze-dried from benzene. The residue is distributed for 250 transfers in the solvent system chloroform-hexane-methanol-water (4:6:8:2). The contents of the tubes in the peak K=1.94 are pooled and concentrated to dryness in vacuo. Yield: 1.55 g., neutralization equivalent as a base 1025 (theoretical 1059. The ultraviolet spectrum shows a maximum at 291 mμ

($E_{1cm}^{1\%}$ 48.8). $[\alpha]_D^{32}$ —38.2°

(c. 1, dimethylformamide).

*Step 14.—O - (L-phenylglycyl)-N-(3-benzyloxypicolinyl)-L - threonyl - D - α-aminobutyryl-L-prolyl-N-methyl-L-phenylalanyl-L-proline* t-Butyl o - (t - butyloxycarbonyl-L-phenylglycyl)-N-(3-benzyloxy - 2 - picolinyl)-L-threonyl-D-α-aminobutyryl-L-prolyl-N-methyl-L-phenylalanyl-L-prolinate (1.2 g., 1.1 mmole) is dissolved in anhydrous trifluoroacetic acid (7.5 ml.), and the solution is held at room temperature for 15 minutes. Ether (250 ml.) is added, and after half an hour at room temperature, the white precipitate which forms is filtered off, washed with ether and dried overnight in vacuo over potassium hydroxide. This dried product is dissolved in methanol (60 ml.) and stirred with a weak base, anion exchange resin (Amberlyst XN–1003) (6.6 g., previously washed with methanol) for three hours at room temperature. The resin is filtered off, and the filtrate is concentrated to dryness in vacuo and freeze-dried from dioxane. Yield: 870 mg. Neutralization equivalent as an acid, 915 (theoretical 903).

*Step 15.—Patricin A* o - (L - phenylglycyl)-N-(3-benzyloxy-2-picolinyl) - L-threonyl - D-α-aminobutyryl-L-prolyl-N-methyl-L-phenylalanyl-L-proline (635 mg., 0.7 mmoles) and cyclohexyl-3-(2-morpholinoethyl) carbodiimide metho-p-toluenesulfonate (1.6 g., 3.7 mmoles) are dissolved in dichloromethane (1 liter). After three days standing at room temperature, 50% aqueous acetic acid (15 ml.) is added and the mixture kept for another 3 hours at room temperature with occasional shaking. After this period, the solvent is removed in vacuo, and the residue is extracted into ethyl acetate. This solution is washed with water (2× 30 ml.) and dried over magnesium sulfate. After removal of the solvent in vacuo, the residue (600 mg.) is dissolved in absolute ethanol (30 ml.) and hydrogenated for 4.5 hours at normal pressure in the presence of 10% palladium on charcoal (100 mg.). The catalyst is filtered off, and the filtrate is concentrated to dryness in vacuo. This crude product (550 mg.) is distributed for 50 transfers in the system chloroform-hexane-methanol-water (4:6:8:2). The contents of the tubes corresponding to the peak with K=1.2 are pooled and concentrated to dryness (170 mg.). Further purification of this material by preparative thin layer chromatography on silica gel (solvent: chloroform-methanol, 95:5) yields 140 mg. (25%) of patricin A. The U.V. spectrum shows a peak at 305 mμ with $E_{1cm}^{1\%} = 98.9$ Molecular weight calculated from the U.V. spectrum, 784 (theoretical 795). Neutralization equivalent as a base:

calc'd, 795; found 935. Neutralization equivalent as an acid: calc'd, 795; found 950.

Patricin B is obtained when t-butyl pipecolate is used in Step 2 and the procedure is otherwise followed identically.

What is claimed is:
1. A compound of the formula

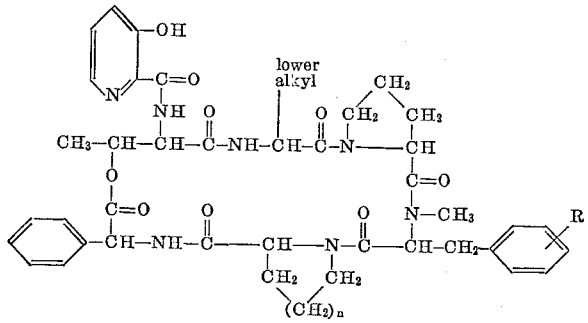

wherein R is a member of the group consisting of hydrogen, halogen and lower alkyl and $n$ is an integer from 1 to 2.

2. A compound as in claim 1 wherein R is hydrogen, the lower alkyl group is ethyl and $n$ is 1.
3. A compound as in claim 1 wherein R is hydrogen, the lower alkyl group is ethyl and $n$ is 2.
4. t-Butyl benzyloxycarbonyl-N-methyl-L-phenylalanyl-L-prolinate.
5. t - Butyl benzyloxycarbonyl - L - prolyl-N-methyl-L-phenylalanyl-L-prolinate.
6. t - Butyl benzyloxycarbonyl - D - α-aminobutyryl-L-prolyl-N-methyl-L-phenylalanyl-L-prolinate.
7. t-Butyl-N-methyl-L-phenylalanyl-L-prolinate.
8. O - (t - butyloxycarbonyl-L-phenylglycyl)-N-benzyloxycarbonyl-L-threonine.
9. t - Butyl O-(t-butyloxycarbonyl-L-phenylglycyl)-N-benzyloxycarbonyl - L - threonyl - D - α - aminobutyryl-L-prolyl-N-methyl-L-phenylalanyl-L-prolinate.
10. t - Butyl-O-(t-butyloxycarbonyl-L-phenylglycyl)-N-(3 - benzyloxypicolinyl)-L-threonyl-D-α-aminobutyryl-L-prolyl-N-methyl-L-phenylalanyl-L-prolinate.
11. O - (L - phenylglycyl)-N-(3-benzyloxypicolinyl)-L-threonyl - D-α-aminobutyryl-L-prolyl-N-methyl-L-phenylalanyl-L-proline.
12. t - Butyl benzyloxycarbonyl-N-methyl-L-phenylalanyl-L-pipecolate.
13. t - Butyl benzyloxycarbonyl-D-α-amino(lower alkanoyl)-L-prolyl-N-methyl-L-phenylalanyl-L-prolinate.
14. t - Butyl O-(t-butyloxycarbonyl-L-phenylglycyl)-N-benzyloxycarbonyl - L - threonyl - D-α-amino(lower alkanoyl)-L-prolyl-N-methyl-L-phenylalanyl-L-prolinate.
15. t - Butyl-O-(t-butyloxycarbonyl-L-phenylglycyl)-N-(3 - benzyloxypicolinyl)-L-threonyl-D-α-amino-(lower alkanoyl)-L-prolyl-N-methyl-L-phenylalanyl-L-prolinate.
16. O - (L - phenylglycyl)-N-(3-benzyloxypicolinyl)-L-threonyl - D-α-amino(lower alkanoyl)-L-prolyl-N-methyl-L-phenylalanyl-L-proline.

References Cited

Schroder et al., The Peptides, vol. II, New York, Academic Press, 1966, pp. 405–409.
Abderhalden et al., cited in Chem. Abst. 25, 77 (1931).
Bergmann et al., cited in Chem. Abst. 27, 108 (1933).

LEWIS GOTTS, *Primary Examiner.*

ELBERT L. ROBERTS, *Examiner.*

M. M. KASSENOFF, *Assistant Examiner.*